United States Patent Office 3,012,938
Patented Dec. 12, 1961

3,012,938
INHIBITION OF ISONIAZID ACETYLATION
Willard J. Johnson, 172 Mariale Ave., Laval-des-Rapides, Quebec, Canada
No Drawing. Filed June 14, 1960, Ser. No. 35,899
4 Claims. (Cl. 167—65)

This invention relates to a therapeutic composition and more particularly to a therapeutic composition including isoniazid and an acetylation inhibitor. This application is a continuation-in-part of copending application Serial No. 625,622, filed December 3, 1956, entitled "Inhibition of Isoniazid Acetylation" (now issued as United States Patent No. 2,971,887 on February 14, 1961), which is itself a continuation-in-part of applicant's copending United States application 452,227, filed August 25, 1954, for an invention of Willard Johnson entitled "Therapeutic Composition Including Acetylation Inhibitor" (now abandoned).

In application Serial No. 452,227, it was explained that the acetylation of sulfonamides with consequent inactivation and loss of the sulfonamides and possibilities of kidney damage could be inhibited by administering with the sulfonamides a substance which would compete with the sulfonamides for the acetylating enzyme. The inhibition thus caused tends to reduce the danger of kidney damage and, by reducing the rate of urinary excretion makes possible the maintenance of therapeutic blood levels of free sulfonamide, at lower dosage levels and with less frequent administration than was hitherto the case. It was also disclosed that the acetylation inhibitors inhibited the acetylation of isoniazid.

The inhibition of the acetylation of isoniazid provides a means of attaining greater effectiveness of a given dose of isoniazid by the use of inhibitors of isoniazid acetylation to prevent the inactivation and rapid excretion of the drug. The inhibitors of isoniazid acetylation are able to produce elevated and sustained blood plasma levels of free, therapeutically active isoniazid, thus obviating the necessity of giving increased dosages to obtain higher blood levels of isoniazid. The instant application further develops the use of applicant's invention in the acetylation of isoniazid.

Isoniazid, as an anti-microbial drug, is considered to be equivalent if not superior to streptomycin in the treatment of pulmonary tuberculosis. However it has been shown by Hughes, J. Pharmacol. and Exper. Therap., 109: 444 (1953), and confirmed by others: Nature, 173: 36 (1954), that when isoniazid is administered to man and monkey, from 50% to 90% of the drug appears in the urine in the acetylated form, that is, as 1-isonicotinyl-2-acetylhydrazine.

Acetyl-isoniazid has less than one five-hundredth the activity of free isoniazid against the tubercle bacillus in vitro, while in vivo the parent drug is at least 100 times more active than the acetyl derivative (3). Moreover, as is known to be the case with sulfonamides, the acetyl-derivative is excreted via the kidney at a much greater rate than is the free drug. Thus, acetylation of isoniazid by the liver leads to rapid inactivation and excretion of the drug, which to some extent accounts for the rapid drop in isoniazid blood levels after the peak blood level has been reached. The over-all effect of acetylation is in all probability a diminution in the therapeutic effectiveness of the administered drug.

Both isoniazid and sulfonamides are acetylated by the same enzyme system which is located in the liver of birds and mamals (including man). The dual acetylation of isoniazid and sulfanilamide is illustrated by the experiment shown in Table I. Isoniazid and sulfanilamide, separately and in combination, were incubated with a cell-free extract of pigeon liver under conditions suitable for acetylation to take place. When 2.92 micromoles of isoniazid and 2.61 micromoles of sulfanilamide were incubated separately with the liver extract, 1.51 micromoles of isoniazid and 0.90 micromole of sulfanilamide were acetylated. When the same amounts of isoniazid and sulfanilamide were incubated in combination, only 1.05 micromoles of isoniazid and 0.30 micromole of sulfanilamide were acetylated; that is, a reduction in acetylation of 30% and 68% respectively. This indicates that isoniazid and sulfanilamide compete for the same enzyme. Therefore, inhibitors of sulfanilamide acetylation will inhibit, also, the acetylation of isoniazid.

TABLE 1

*Competition of isoniazid (INH) and sulfanilamide for the same acetylating enzyme in pigeon liver extract*

| Additions | INH acetylated, μm. | Inhibition of INH acetylation, percent | Sulfanilamide acetylated, μm. | Inhibition of sulfanilamide acetylation, percent |
|---|---|---|---|---|
| INH | 1.51 | | | |
| Sulfanilamide | | | 0.90 | |
| INH, Sulfanilamide | 1.05 | 30 | 0.30 | 68 |

*Vessel components.*—1 ml. of pigeon liver extract; 60 μm. potassium phosphate buffer (pH 7.4); 60 μm. acetate; 60 μm. citrate; 9 μm. ATP; 2.92 μm. INH; 2.61 μm. sulfanilamide. Total volume 3 ml.; 90 minutes incubation at 37° C.

The inhibitors used in accordance with this invention as defined in Serial No. 625,622 are soluble, non-toxic compounds selected from the group having the general formula

R—A where R is at least one member selected from the group consisting of hydrogen, a halogen, hydroxyl, amino, lower alkyl radicals having not more than three carbon atoms, phenyl, and carboxyl and where A is selected from the group consisting of pyridine, benzamide, benzoic acid hydrazide and benzoylhydroxamic acid and pharmaceutically acceptable salts thereof. The inhibitors used in accordance with the present continuation-in-part application are selected from the group consisting of 4-aminosalicylhydroxamic acid, and α-ethyl-thioisonicotinamide and pharmaceutically acceptable salts thereof.

A cell-free extract of pigeon liver was employed for testing the inhibitory effect of various compounds on isoniazid acetylation. The compounds which were shown to be particularly effective were p-aminosalicylamide, p-aminobenzoic acid and gentisamide, as species for the generic invention defined in Serial No. 625,622, and 5-bromosalicylhydroxamic acid, 4-aminosalicylhydroxamic acid, 6-aminoicotinylhydroxamic acid and α-ethyl-thioisonicotinamide as species for the generic invention defined by the present continuation-in-part application. P-aminosalicylic acid is also, as shown by experiments with rabbits, an effective acetylation inhibitor when used in the ratio of 1/10 to 1/12 is isoniazid to paraminosalicylic acid. The results obtained in the in vitro experiments are reproduced in Table 2 below.

TABLE 2

*Inhibition of isonilazid (INH) acetylation in vitro* [1]

| Inhibitor | Concentration of inhibitor, moles/litre | Percent inhibition of acetylation |
|---|---|---|
| 5-Bromosalicylamide [2] | $1.3 \times 10^{-4}$ | 52 |
| Salicylamide [2] | $5 \times 10^{-4}$ | 24 |
|  | $10^{-3}$ | 36 |
| o-Cresotamide | $2 \times 10^{-3}$ | 53 |
|  | $10^{-3}$ | 36 |
| Gentisamide | $2.5 \times 10^{-4}$ | 54 |
|  | $4 \times 10^{-4}$ | 74 |
|  | $10^{-3}$ | 22 |
| p-Hydroxybenzamide [2] | $8 \times 10^{-4}$ | 29 |
| Gallic Acid Amide | $10^{-3}$ | 49 |
| p-Aminosalicylic Acid [2] | $10^{-3}$ | 86 |
| p-Aminosalicylamide | 5 | 70 |
| o-Hydroxybenzal isonicotinyl hydrazone | $10^{-3}$ | 41 |
| p-Aminobenzoic Acid | $10^{-3}$ | 50 |
| 6-Aminonicotinamide [2] | $2 \times 10^{-3}$ | 36 |
| p-Aminophenylacetic Acid | $2 \times 10^{-3}$ | 31 |
| 4-Amino-5-imidazole-carboxamide | $8 \times 10^{-3}$ | 19 |
| Pyrazinamide [2] | $2 \times 10^{-3}$ | 53 |
| 1-Hydrazinophthalazine | $5 \times 10^{-4}$ | 32 |
| Salicylhydroxamic Acid | $2.5 \times 10^{-4}$ | 56 |
| 5-Bromosalicylhydroxamic Acid | $2.5 \times 10^{-4}$ | 65 |
| 4-Aminosalicylhydroxamic Acid | $10^{-3}$ | 58 |
| 6-Aminonicotinylhydroxamic Acid | $10^{-3}$ | 50 |
| α-Ethyl-thioisonicotinamide |  |  |

[1] Pigeon liver acetylating system (see W. Johnson, Canad. J. Biochem. Physiol. 33:107 1955). The INH concentration was $8 \times 10^{-4}$ M unless otherwise indicated.
[2] In these experiments the INH concentration was $7.75 \times 10^{-4}$ M.

Table 3 shows 2 experiments in which sodium PAS was employed as an inhibitor of isoniazid acetylation.

In the first experiment 2 rabbits, each weighing 6 kg., were given 300 mg. of isoniazid by stomach tube. Forty-eight hours later the same rabbits were given 300 mg. of isoniazid plus 3 g. of sodium PAS. Blood plasma levels of free isoniazid were determined at intervals of 1¼, 2¼ and 4 hours after dosage. In both rabbits the administration of PAS with isoniazid resulted in an enhanced plasma level of free isoniazid. This effect of PAS was most striking at the four-hour interval, when the plasma level of free isoniazid was more than twofold that of the control level. A similar effect of PAS is shown in experiment 2 of Table 3.

It should be mentioned that 24 hours after the administration of a single dose of isoniazid there is no detectable sign of the drug in the bloodstream, and hence no carry-over of isoniazid from one experiment to the next. As an extra precaution the order of drug administration was reversed; that is, isoniazid alone was given 48 hours after the dose of isoniazid plus PAS.

Experiments were performed to ascertain the relationship between the dose level of PAS and the plasma level of free isoniazid. The same three rabbits were used throughout this set of experiments. The isoniazid dose was kept constant at 50 mg. per kg. body weight and the sodium PAS dose was varied from 0 to 600 mg. per kg. body weight. That is, the isoniazid to sodium PAS ratio, on a weight basis, varied from 1:0 to 1:12. Typical results are shown in Table 4. It can be seen that there is a progressive increase in the plasma level of free isoniazid at the 1¼ hr. and 4 hr. intervals as the dose of sodium PAS is increased. Thus, when isoniazid and sodium PAS were administered in the ratio of 1:12 the plasma level of free isoniazid was 209% of the level attained when isoniazid alone was given.

TABLE 4

*Effect of increasing doses PAS on the blood plasma levels of free isoniazid in rabbits* [1]

| Expt. No. | Dosage mg./kg./body wt. | | INH/Sodium PAS ratio | Blood plasma levels (mg. percent) of free isoniazid [2] | | Percent Increase of free isoniazid plasma level at 4 hour interval |
|---|---|---|---|---|---|---|
|  | INH | sodium PAS |  | at intervals, 1¼ hrs. | after dosage of 4 hrs. |  |
| 1 | 50 | 0 | 1:0 | 1.75 | 0.45 | |
| 2 | 50 | 50 | 1:1 | 1.97 | 0.67 | 49 |
| 3 | 50 | 250 | 1:5 | 2.45 | 0.86 | 91 |
| 4 | 50 | 600 | 1:12 | 2.63 | 1.39 | 209 |

[1] The same 3 rabbits, each weighing 3 kg., were used for every experiment.
[2] Free isoniazid blood plasma levels as shown are average values for the group of 3 rabbits.

The effect of 5-bromosalicylhydroxamic acid on plasma levels of isoniazid was tested in 7 rabbits, each rabbit acting as its own control. The results, shown below in

TABLE 3

*Effect of p-aminosalicylic acid (sodium) on blood plasma levels of free isoniazid (INH) in rabbits following a single oral dose*

| Expt. No. | Rabbit No. | Weight, kg. | Drug Dose (mg./kg. body wt.) | 1¼ hrs. | | 2¼ hrs. | | 4 hrs. | |
|---|---|---|---|---|---|---|---|---|---|
|  |  |  |  | mg. percent | Percent of control | mg. percent | Percent of control | mg. percent | Percent of control |
| 1 | 1 | 6 | Control (INH50) | 4.8 |  | 2.4 |  | 1.4 |  |
|  |  |  | INH50+PAS (Sodium) 500 | 6.3 | 131 | 5.2 | 217 | 2.9 | 207 |
|  | 2 | 6 | Control (INH50) | 3.1 |  | 2.1 |  | 1.1 |  |
|  |  |  | INH50+PAS (Sodium) 500 | 4.9 | 126 | 3.4 | 162 | 2.4 | 218 |
| 2 | 3 | 3 | Control (INH50) | 1.58 |  |  |  | 0.22 |  |
|  |  |  | INH50+PAS (Sodium) 600 | 2.76 | 111 |  |  | 1.4 | 636 |
|  | 4 | 3 | Control (INH50) | 2.24 |  |  |  | 0.64 |  |
|  |  |  | INH50+PAS (Sodium) 600 | 2.86 | 128 |  |  | 1.86 | 290 |

Table 5, indicate that the administration of INH in combination with 5-BSH gives rise to an appreciable increase in plasma levels of free INH, over that which is obtained when INH alone is administered.

TABLE 5

*Effect of 5-bromosalicylhydroxamic acid (5-BSH) on blood plasma levels of free isoniazid (INH) in rabbits following a single oral dose*

| No. of animals | Drug Dose (mg./kg. body wt.) | Blood Plasma Levels of Free INH [1] | | | | | |
|---|---|---|---|---|---|---|---|
| | | 1 hour | | 2 hour | | 4 hour | |
| | | mg. percent | Percent of control | mg. percent | Percent of control | mg. percent | Percent of control |
| 7 | Control (INH 50) | 1.08 | | 0.84 | | 0.54 | |
| 7 | INH 50+5-BSH 500 | 1.52 | 140 | 1.29 | 153 | 0.89 | 164 |

[1] Average of 7 rabbits.

STUDIES IN HUMANS

The effect of 5-bromosalicylhydroxamic acid (5-BSH) on plasma levels of isoniazid (INH) as observed in rabbits has been corroborated in 32 human subjects (at the Royal Edward Laurentian Hospital, Montreal, Quebec, Canada). The experimental conditions were as follows:

*INH alone.*—Patients received their usual therapeutic doses of INH (300–400 mg. per day) for 3 days prior to the test. On the day of the test they received 150 mg. INH at 8:00 a.m. and 3 hours later blood was taken for INH determination.

*INH+5-BSH.*—Patients received 300–400 mg. of INH and 3 grams 5-BSH for 3 days prior to the test. On the day of the test they received 150 mg. INH plus 1 gram 5-BSH at 8:00 a.m. and blood was taken 3 hours later for INH determination.

It should be noted that each patient served as his own control. The results, shown in Table 6, indicate that 5-bromosalicylhydroxamic acid produced a fourfold increase in isoniazid blood concentration in 9 patients and a two fold increase in 23 patients. No patient failed to show an increase in the blood concentration of isoniazid.

TABLE 6

*INH blood levels in patients receiving INH [1] alone and in combination with 5-BSH [2]*

| Patient | INH Alone, mcg./ml. | INH+5-BSH, mcg./ml. |
|---|---|---|
| F | 1.0 | 4.0 |
| S | 0.5 | 2.0 |
| P | 1.0 | 2.0 |
| Y | 1.0 | 2.0 |
| L | 0.5 | 1.0 |
| M | 1.0 | 2.0 |
| L | 2.0 | 4.0 |
| M | 0.5 | 1.0 |
| H | 0.5 | 1.0 |
| Z | 1.0 | 2.0 |
| M | 1.0 | 2.0 |
| M | 0.5 | 2.0 |
| G | 2.0 | 4.0 |
| M | 1.0 | 2.0 |
| W | 1.0 | 4.0 |
| B | 1.0 | 2.0 |
| J | 0.5 | 1.0 |
| S | 0.5 | 1.0 |
| C | 0.5 | 1.0 |
| R | 2.0 | 4.0 |
| O | 0.5 | 2.0 |
| V | 1.0 | 2.0 |
| V | 0.5 | 1.0 |
| C | 1.0 | 4.0 |
| S | 2.0 | 4.0 |
| M | 0.5 | 1.0 |
| B | 1.0 | 2.0 |
| C | 1.0 | 4.0 |
| C | 0.5 | 2.0 |
| C | 1.0 | 2.0 |
| M | 0.25 | 1.0 |
| S | 1.0 | 2.0 |

[1] Isoniazid.
[2] 5-bromosalicylhydroxamic acid.

Table 7, which is based on data reported by Mandel et al., provides further results of clinical testing of the invention and demonstrates its effectiveness.

TABLE 7

| Subject+amt. of acetylation inhibition given with test dose 3 hrs. later | Time of determination after test dose of isoniazid of 4 mg. per kg. body wt., hrs. | Antimicrobially Active Isoniazid Serum level | | | |
|---|---|---|---|---|---|
| | | INH Alone, μg. per mg. | INH+ PAS, μg. per mg. | INH+ PABA, μg. per mg. | INH+ PAS-amide |
| 1 (2.5 gms) | 3 | 0.8 | 1.6 | 1.6 | 3.2 |
| | 6 | 0.4 | 0.4 | 0.8 | 1.6 |
| 2 (2.5 gms) | 3 | 0.8 | 0.8 | 0.8 | >3.2 |
| | 6 | 0.2 | 0.4 | 1.6 | 0.8 |
| 3 (2.5 gms) | 3 | 0.8 | 1.2 | 1.6 | 2.4 |
| | 6 | 0.2 | 0.4 | 1.6 | 1.6 |
| 4 (2.5 gms) | 3 | 0.6 | 0.8 | 2.4 | 3.2 |
| | 6 | 0.2 | 0.2 | 0.6 | 0.8 |
| 5 (5 gms) | 3 | 0.8 | 2.4 | 3.2 | 3.2 |
| | 6 | 0.4 | 0.6 | 3.2 | 1.6 |
| 6 (2.5 gms) | 6 | <0.4 | 1.2 | >1.6 | 1.6 |
| 7 (2.5 gms) | 6 | 0.2 | | 0.4 | 0.8 |
| 8 (2.5 gms) | 6 | 0.2 | | 0.6 | 1.6 |
| 9 (5 gms) | 3 | 0.8 | 2.4 | 3.2 | |
| | 6 | 0.4 | 0.6 | 3.2 | |
| 10 (2.5 gms) | 3 | 0.6 | 0.8 | 2.4 | |
| | 6 | 0.2 | 0.2 | 0.6 | |
| 11 (5 gms) | 6 | 0.4 | 0.4 | 1.2 | |
| 12 (5 gms) | 6 | 0.4 | 0.8 | 1.6 | |
| 13 (2.5 gms) | 6 | 0.2 | 0.2 | 0.4 | |
| 14 (2.5 gms) | 6 | 0.4 | | 1.6 | |

In the above table INH refers to isoniazid, PAS to para-amino salicyclic acid, PABA to para-aminobenzoic acid and PAS-amide to p-aminosalicylamide.

While the ratio of isoniazid to acetylation inhibitor may vary widely, satisfactory results are normally achieved through the use of ratios of isoniazid to acetylation inhibitor of 1:5 to 1:30.

Thus, when the inhibitor is 5-bromosalicylhydroxamic acid a suitable dose for an adult would be a tablet containing as its active ingredients 50 mg. of isoniazid and 500 mg. of 5-bromosalicylhydroxamic acid to be administered several times daily.

I claim:

1. A therapeutic composition comprising as its active ingredients isoniazid and an acetylation inhibitor selected from the group consisting of:
   (a) 4-aminosalicylhydroxamic acid, and
   (b) α-ethyl-thioisonicotinamide, and the pharmaceutically acceptable salts thereof.

2. A therapeutic composition comprising as its active ingredients isoniazid and 4-aminosalicylhydroxamic acid in a ratio of between 1:5 and 1:30.

3. A therapeutic composition comprising as its active ingredients isoniazid and α-ethyl-thioisonicotinamide in a ratio of between 1:3 and 1:15.

4. A therapeutic composition comprising as its active ingredients isoniazid and the pharmaceutically acceptable salts of α-ethyl-thioisonicotinamide in a ratio of between 1:3 and 1:15.

References Cited in the file of this patent
UNITED STATES PATENTS 2,937,116     Johnson _____ May 17, 1960